United States Patent [19]

Yamada

[11] 3,723,618

[45] Mar. 27, 1973

[54] SYNERGISTIC FUNGICIDAL COMPOSITION FOR THE CONTROL OF DISEASES OF RICE PLANTS

[75] Inventor: Yasuo Yamada, Tokyo, Japan

[73] Assignee: Bayer Aktiengesellschaft, Leverkusen, Germany

[22] Filed: Nov. 17, 1970

[21] Appl. No.: 90,466

[30] Foreign Application Priority Data

Nov. 24, 1969 Japan.................................44/93773

[52] U.S. Cl....................................424/225, 424/279
[51] Int. Cl..........A01n 9/02, A01n 9/28, A01n 9/36
[58] Field of Search............424/225, 279; 260/243.3

[56] References Cited

UNITED STATES PATENTS 3,499,951   3/1970   Schrader et al.......................424/225

FOREIGN PATENTS OR APPLICATIONS 6,811,990   2/1969   Netherlands
6,611,810   2/1967   Netherlands
6,611,860   2/1967   Netherlands

OTHER PUBLICATIONS

Chem. Abst. Vol. 52, p. 10,001 (1958)

Primary Examiner—Jerome D. Goldberg
Assistant Examiner—Allen J. Robinson
Attorney—Burgess, Dinklage & Sprung

[57] ABSTRACT

Fungicidal compositions in the form of synergistic combinations of 4,5,6,7-tetrachlorophthalide and O-(ethyl, n-propyl or isopropyl)-S,S-diphenylphosphorodithiolate which are individually known compounds, which combinations possess synergistic fungicidal properties especially for the control of diseases of rice plants.

10 Claims, No Drawings

SYNERGISTIC FUNGICIDAL COMPOSITION FOR THE CONTROL OF DISEASES OF RICE PLANTS

The present invention relates to and has for its objects the provision of particular new fungicidal compositions in the form of synergistic combinations of 4,5,6,7-tetrachlorophthalide and O-(ethyl, n-propyl or isopropyl)-S,S-diphenylphosphorodithiolate which are individually known compounds, which combinations possess outstanding synergistic fungicidal properties especially for the control of diseases of rice plants, optionally in the form of carrier composition mixtures of such synergistic combinations with solid and/or liquid dispersible carrier vehicles, and methods for using such synergistic combinations in a new way especially for combating diseases of rice plants, with other and further objects becoming apparent from a study of the within specification and accompanying examples.

The aforementioned combination has excellent synergistic preventive and curing effects with a prolonged duration of action in controlling diseases of rice plants, particularly blast (caused by *Piricularia oryzae*) and sheath blight (caused by *Pellicularia sasakii*). The combination is also characterized by excellent adaptability in application and low toxicity to men and domestic animals.

It has been found that when two known insecticides are mixed together, the insecticidal activity can be doubled (Japanese Patent No. 438,268; Patent Publication No. 20792/64) and the immediate effect and duration of insecticidal activity are increased (Japanese Patent No. 490,900; Patent Publication No. 10038/66). It has also been found that when known fungicides and insecticides are mixed together, fungicidal and insecticidal effects can be obtained simultaneously (Japanese Patent No. 414130; Patent Publication No. 149944/63). It has been furthermore found that when two known insecticides applicable to different ranges of pests are mixed, the range of application of the mixed insecticide is broadened (Japanese Patent No. 469,435; Patent Publication No. 22399/65). These proposals have been made with a view to increasing or doubling synergistically the known activities of the chemicals to be used.

It has now surprisingly been found that when two particular compounds of different types, namely a particular substituted phthalide and an organic phosphoric acid ester of a certain group, which possess different properties as fungicides, are mixed together, the preventive and curative effects of each component for controlling rice blast can be increased by the synergistic action of both components. The mixed fungicide of this invention has the valuable characteristic that limitation of the application period imposed on each component when used singly are removed or reduced, and the control of rice blast can be accomplished more effectively. This means that the mixed fungicide of this invention is excellent in saving labor in agriculture.

The invention provides a fungicidal composition containing as active ingredients 1. 4,5,6,7-tetrachlorophthalide of the formula

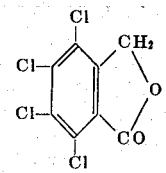

(I)

and 2. an O-alkyl-S,S-diphenylphosphorodithiolate of the general formula

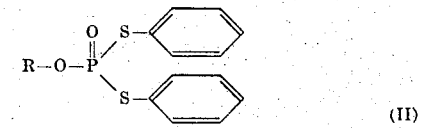

(II)

wherein
R is alkyl of two or three carbon atoms, alone or in admixture with a diluent or carrier.

The composition preferably contains ingredients (I) and (II) in a weight ratio of from 4 to 1:1.

The invention also provides a method of combating fungus pests (especially in rice cultivation) which comprises applying to the pests or a habitat thereof a composition according to the invention.

The invention also provides protection to crops (especially rice crops) from damage by fungus pests by being grown in areas to which, immediately before or during the time of the growing, a composition according to the invention was applied.

It has previously been suggested that compounds of a broad range including compounds of the above formula (II) can be used as fungicides (Dutch Specification No. 66-11860). As a result of research carried out in connection with the present invention it has been found that the compounds of the formula (II) are effective against blast.

It has now very surprisingly been found that when a mixture of the compound of formula (I) and a compound of formula (II) is used as a fungicide in the cultivation of rice plants, greatly improved results can be obtained.

Rice plants are susceptible to various types of damage caused not only by harmful insects but also by pathogenic fungi during cultivation, and among them the damage caused by blast is greatest.

According to the research carried out in connection with the present invention, fungicides of above formulas (I) and (II), like all the organic synthetic compounds developed up to now, lack one or two of three factors required in controlling diseases of rice plants, namely a preventive effect, a curative effect and prolonged duration of the effect, and they are insufficiently effective when used in practice, particularly for controlling blast which is a very serious disease of rice plants, and these compounds are less effective than the conventional strong fungicides containing dangerous heavy metals.

It is quite unexpected that the above problem is solved by combining the fungicides of formulas (I) and (II). This combination can overcome common defects of organic synthetic compounds developed up to the present, and the mixed fungicides of this invention can be said to be a newly developed fungicide being free of any heavy metal in use for cultivation of rice plants. Such combination will replace organic mercury compounds containing a heavy metal harmful to men and domestic animals which have been hitherto used in this field.

Organic phosphoric acid esters of formula (II) to be used in this invention, namely O-alkyl-,S,-diphenylphosphorodithiolates, can be prepared by the method described in the Specification of Dutch Patent No. 66-

11810.

Specific esters are as follows:

O-ethyl-S,S-diphenylphosphorodithiolate,
O-n-propyl-S,S-diphenylphosphorodithiolate, and
O-iso-propyl-S,S-diphenylphosphorodithiolate.

In addition to the above-mentioned excellent effects against blast which is a fatal disease of rice plants, the mixed fungicides of this invention exhibit direct or indirect effects for controlling other diseases occurring in rice plants such as sheath blight (disease caused by *Pellicularia sasakii*), brown spot (disease caused by *Cochliobolus miyabeanus*), stem-rot (disease caused by *Helminthosporium sigmoideum*) and bacteria leaf blight (disease caused by *Xanthomonas oryzae*).

The mixed fungicides of this invention may be prepared by mixing the specific compound of formula (I) and at least one specific compound of formula (II), and may contain an inert gaseous, liquid or solid diluent or carrier, optionally with additional compounds such as surfactants, emulsifiers, dispersing agents, spreaders, wetting agents and stickers, as are used in agriculture, and they may be used in various forms.

As a gaseous diluent or carrier there may be cited Freon and other aerosol propellents which are gaseous under normal conditions.

The particular synergistic combinations of active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the synergistic combination of active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica or quartz, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents(e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the synergistic combination of active compounds according to the instant invention may be employed alone or in the form of carrier composition extended mixtures with such solid and/or liquid dispersible carrier vehicles and/or with other known compatible active agents, especially agricultural chemicals such as insecticides, nematocides, fungicides (inclusive of antibiotic substances) herbicides, growth-adjusting agents, fertilizers and fertilizing substances, if desired, or in the form of particluar dosage preparations for specific application made therefrom, such as solutions, emulsifiable liquids, concentrated emulsions, wettable powders, soluble powders, pastes, oils, aerosol preparation, fumigating agents, dusts, particles, coated particles, tablets, granules and pellets.

The mixed fungicide of this invention may be applied to pathogenic fungi or places where pathogenic fungi live directly or by means of a tool in accordance with a spraying, scattering, atomizing, misting, dusting, particle-scattering, mixing, fumigating, injecting or powder-coating method. It is also possible to apply the mixed fungicide of this invention in accordance with the so-called "ultra low-volume" spraying method. In this method it is possible to increase the concentration of the active mixing components to 95 percent, and even up to 100 percent.

In actual application, the concentration of the active components in the ready-to-use preparation may be varied within a broad range for the same reasons described in respect to the preparation form. It is generally preferred that the concentration of the total of the two active components is 0.005–10 percent by weight, especially 0.01–5.0 percent by weight. The amount applied of the fungicide of this invention is about 15–1,000 g per 10 ares, preferably 40–600 g per 10 ares, reckoned as the total of the two active components. It is possible or sometimes necessary to apply the fungicide in an amount exceeding or below the above ranges.

According to this invention there are provided the following methods of controlling and preventing diseases of rice plants with the use of the above-mentioned fungicidal composition of this invention:

1. A method of controlling and preventing diseases of rice plants characterized by applying a mixture of the active compounds of this invention and/or a mixed fungicide containing them to places where rice plants grow (inclusive of water surfaces and soils of paddy fields) and/or rice plants, and 2. A method of controlling and preventing blast of rice plants characterized by applying a mixture of active compounds of this invention and/or a mixed fungicide containing them to places where rice plants grow (inclusive of water surfaces and soils of paddy fields) and/or rice plants before, during or after occurrence of blast in rice plants.

This invention is illustrated, without limitation, by the following examples:

EXAMPLE 1

A mixture of 50 percent by weight of a 1:1 mixture of the active compounds of formulas (I) and (II) of this invention, 20 percent by weight of an emulsifier (alkyl aryl polyglycol ether) and 30 percent by weight of a solvent (xylene) was stirred to form a homogeneous emulsifiable concentrates (emulsion preparation). This formulation was diluted with water (in an amount of about 1,000 – 2,000 times by volume) to obtain the desired concentration of the active compounds. The ready-to-use preparation thus produced was sprayed on pathogenic fungi or places where they grow by means of a sprayer.

EXAMPLE 2

In the same manner as in Example 1, emulsifiable concentrates (emulsion preparations) of the active compounds of formulas (I) and (II) were prepared separately. Each liquor was diluted with water (about 500 – 1,000 times by volume) until the concentration of the active compound reached the desired value. The suspensions thus produced were mixed together before spraying (mixing ratio = 1:1) (by a tank mixing method) to form a ready-to-use preparation, which was sprayed in the same manner as in Example 1.

EXAMPLE 3

A mixture (25 percent) by weight of the active compounds of formulas (I) and (II) in a mixing ratio of 2:1, an emulsifier (7 percent) by weight (alkyl aryl polyglycol ether) and finely divided powder (68 percent) by weight of an inert mineral substance (1:5 mixture of diatomaceous earth and clay) were ground and mixed together to form a wettable powder (wettable preparation). This formulation was diluted with water (about 250 – 1,000 times) to obtain the desired concentration of the active compounds. The ready-to-use preparation thus produced was applied in the same manner as in Example 1.

EXAMPLE 4

A mixture (2 percent) by weight of active compounds of formulas (I) and (II) in a mixing ratio of 1:1 and a mixture (98 percent) by weight of talc and clay in a mixing ratio of 3:1 were mixed together by means of a mixing apparatus (such as a Lodecke mixer) and made homogeneous by a grinding mill to form a dust formulation. This formulation thus produced was directly applied to stems and leaves of rice plants at a rate of 3 – 4 Kg per 10 ares by means of a dusting machine.

EXAMPLE 5

A 3:1 mixture of active compounds of formulas (I) and (II) was dissolved in a solvent (for instance, acetone) and the solution was sprayed on clay particles of a diameter of 0.2 – 1 mm while mixing the clay particles by means of a mixing apparatus (for instance, V-type mixer) until the concentration of the active compounds was 5 percent by weight in the particles. Thereafter, the solvent was evaporated and the particles were dried to form ready-to-use particles. They were directly applied to the water surface or soil of the paddy field at a rate of 4 – 6 Kg per 10 ares.

Test results showing heretofore unknown, excellent synergistic effects attained by the fungicides of this invention and mixtures thereof will now be given.

EXAMPLE 6

Test against blast (Piricularia oryzae) of rice plants / (pot test)

The effects of the active component of formula (I), 4,5,6,7-tetrachlorophthalide, the active component of formula (II), O-alkyl-S,S-diphenylphosphorodithiolate and mixtures of these two components against blast of rice plants were examined by the following test procedures.

The results are shown in Table 1 and 2.

Test procedures:

| Carrier : | 5 parts by weight of clay |
|---|---|
| Emulsifier : | 1 part by weight of polyoxyethylene alkylarylether |

To prepare a suitable preparation of the active compound, 1 part by weight of the mixed fungicide of this invention or each of the active compound was thoroughly mixed with the stated amount of carrier and the stated amount of emulsifier. The obtained wettable powder was then diluted with water to the desired concentration.

a. Test of protective effects against rice blast and residual thereof:

Rice plants (jukkoku variety) were cultivated in a pot of 12 cm diameter. The preparation of this invention and each of the active compounds were sprayed separately at the tillering stage until dripping wet.

A half of the treated pots was kept in a chamber maintained at 25° C and a relatively humidity of 100 percent for 2 days from the next day after the chemical spraying, and the remaining half was kept in the same chamber for 2 days from the fifth day after the chemical spraying. While kept in the chamber, the rice plants were inoculated twice with a suspension of spores of artificially cultured pathogenic fungi of blast (50,000 – 100,000 spores/ml) by spraying. From the results of the inoculation made the next day after the chemical spraying, the protective effect can be evaluated, and from the results of the inoculation made the fifth day after the chemical spraying, the residual effect (the durability of the effect of chemicals) can be ascertained. Seven days after the inoculation, 10 stems were selected from each pot and the damage degree of the uppermost 2 developed leaves were measured. The phytotoxicity of the chemical to the rice plants was also examined coincidentally with the examination of the disease attack degree and the damage degree was calculated.

b. Test on curative effects against blast of rice plants:

This test was conducted to evaluate the curative effect of the test chemicals against the pathogenic fungi which had infected rice plants and caused the disease. Rice plants of the same variety as used in test (a) of the protective effect were kept in a chamber maintained at 25° C and a relative humidity of 100 percent for 2 days, during which the rice plants were inoculated with the same suspension of spores of the artificially cultured pathogenic fungi of blast as used in test (a) by spraying. The next day, the mixed fungicide of this invention and each of the active compounds were sprayed separately in the same manner as adopted in the test of the protective effect. Six days after the chemical spraying, the attack degree of blast was examined for each pot in the same manner as in the test of the protective effect and the damage degree was calculated.

| Disease attack degree | Ratio of areas on which disease spots appear |
|---|---|
| 0 | 0% |
| 0.5 | less than 2% |
| 1 | 3 – 5% |
| 2 | 6 – 10% |
| 3 | 11 – 20% |
| 4 | 21 – 40% |
| 5 | more than 40% |

Damage degree $= [(\frac{1}{2}n_{0.5} + n_1 + 2n_2 + 4n_3 + 8n_4 + 10n_5)/10\,N] \times 100$ in which $N$ — the total number of the leaves examined $n_{0.5}$ — the number of the leaves of a disease attack degree of 0.5

$n_1$ — the number of the leaves of a disease attack degree of 1

$n_2$ — the number of the leaves of a disease attack degree of 2

$n_3$ — the number of the leaves of a disease attack degree of 3

$n_4$ — the number of the leaves of a disease attack degree of 4

$n_5$ — the number of the leaves of a disease attack degree of 5

TABLE 1

Test results of effects against blast of rice plants (pot test)
Wettable Preparation (Wettable powder)

| Sample compound | Active component concentration | Damage degree protective effect | Damage degree residual effect | Damage degree curative effect | Phytotoxicity |
|---|---|---|---|---|---|
| (I) | 0 | | | | |
| | 0.25 | 6.4 | 13.7 | 66.7 | — |
| | 0.05 | 0 | 1.2 | 69.2 | — |
| (II) | 0.025 | 5.1 | 33.4 | 8.0 | — |
| | 0.05 | 1.0 | 20.6 | 0.3 | — |
| (I) + (II) (1:1) mixed fungicide of this invention | 0.025 | 4.3 | 16.7 | 9.3 | — |
| | 0.5 | 0 | 2.2 | 0.3 | — |
| (I) + (II) (2:1) mixed fungicide of this invention | 0.025 | 5.0 | 14.3 | 14.5 | — |
| | 0.5 | 0 | 1.0 | 1.7 | — |
| Untreated control | - | 40.6 | 56.7 | 59.0 | — |

Notes: 1)(I) : 4,5,6,7-tetrachlorophthalide (II) : 0-ethyl-S,S-diphenylphosphorodithiolate 2) The symbol "—" in the "Phytotoxicity" means that the chemical did not give any adverse effect on the growth of rice.

c. Test on effects against Leaf Blast of rice plant / (Field-test)

Diluent : 97 parts by weight of talc

To prepare a suitable preparation of the mixed fungicide of this invention or each of the active compound, 3 parts by weight of active compound were thoroughly mixed with the stated amount of diluent by crushing and mixing. The obtained dust was directly applied.

Rice plants were cultivated on a rectangular field (1m × 2m) in a customary manner and the preparation of the test chemicals (dust formulation) were applied at the time when naturally infected blast came to appear on leaves of rice plants. The influences of the relation between the time of appearance of the disease and the time of application of the said preparation of test chemicals on the blast-controlling effects were examined.

a. Variety of rice plant: Asahi (susceptible to blast)

b. Sowing date and amount of seeds: July 17 and 80 g/l m$^2$ c. Testing areas: Each area was 1 m$^2$ and total area was 3 m$^2$ to each test chemicals.

d. Chemical-applying time and amount applied of chemical:

Protective effect-test areas;

First time — August 4 (before appearance of the disease)

Second time — August 10 (initial stage of the disease)

Curative effect-testing areas;

First time — August 10 (initial stage of the disease)

Second time — August 16 (advanced stage of the disease)

The preparation of test chemical (dust formulation) was applied homogeneously by means of a small hand duster in an amount of 4 Kg (120 g of active ingredient)/10 ares.

e. Examination date and examination procedures;

Examination date — August 30

With respect to optionally selected 50 stems per one area, the ratio of the area on which disease spots appeared was examined according to the following Standard of Examination of Disease Degree of Leaf Blast (Principle of Examination of Control and Prevention of Diseases of Ordinary Plants by Fungi and Insects compiled by Ministry of Agriculture and Forestry, Agricultural Administration Bureau, in September, 1965).

Standard of the disease degree of Leaf Blast;

The degree of the disease appearance of Leaf Blast was classified into grades shown in the following table according to the standard chart for examination of the disease degree of Leaf Blast.

| Intensity: | I | II | III ½Ψ | | V |
|---|---|---|---|---|---|
| Disease degree: | Nil | Small | Middle | Great | Extreme |
| Ratio of area on which spots | 0 | 0.1–0.5 | 0.6–2.0 | 2.1–10.0 | More than 10.1 |

Ratio of area on which spots appeared (%) = $\dfrac{\text{Area of disease spot-appearing leaves}}{\text{Area of whole leaves}} \times 100$ (The area of whole leaves did not contain the area of leaf sheath or naturally withered leaf.)

Controlling value = $\dfrac{(\text{ratio of area on which disease spots appeared in the untreated area}) - (\text{ratio of area on which disease spots appeared in the treated area})}{(\text{ratio of area on which disease spots appeared in the untreated area})} \times 100$

TABLE 2

Test results of effects against Leaf Blast of rice plants

| Test chemicals (active ingredient g / 10 ares | Protective effect | | Curative effect | |
|---|---|---|---|---|
| | ratio of area on which disease spots appeared (%) | Controlling value | Ratio of area on which disease spots appeared (%) | Controlling value |
| I 120 | 5.0 | 94 | 68.6 | 5 |
| II 120 | 21.5 | 74 | 6.7 | 91 |
| I + II 80+40 | 3.7 | 96 | 7.2 | 90 |
| Untreated control | 82.6 | 0 | 72.4 | 0 |

Note: In Table 2, the chemicals (I) and (II) are the same as in Table 1.

It will be realized by the artisan that all of the foregoing synergistic compositions of active compound combinations contemplated by the present invention possess the desired selective fungicidal properties, as well as a comparatively low toxicity toward warm-blooded creatures and a concomitantly low higher plant phytotoxicity, enabling such synergistic combinations of active compounds to be used with correspondingly favorable compatibility with respect to warm-blooded creatures and higher plants for more effective control and/or elimination of fungi, by application of such synergistic combinations of active compounds to such plants and/or their habitat.

It will be appreciated that the instant specification and examples are set forth by way of illustration and not limitation, and that various modifications and changes may be made without departing from the spirit and scope of the present invention.

What is claimed is:

1. A synergistic fungicidal composition containing as active ingredients (1) 4,5,6,7-tetrachlorophthalide of the formula

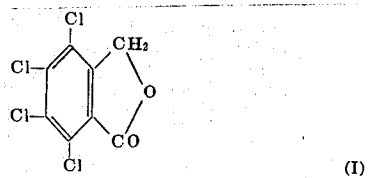

(I)

and (2) an O-alkyl-S,S-diphenylphosphorodithiolate of the formula

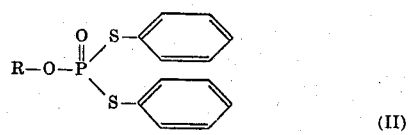

(II)

wherein
R is alkyl of two or three carbon atoms, compounds (I) and (II) being present in a weight ratio of about 4 to 1:1.

2. The synergistic fungicidal composition according to claim 1 containing as active ingredients (1) 4,5,6,7-tetrachlorophthalide and (2) O-ethyl-S,S-diphenylphosphorodithiolate.

3. The synergistic fungicidal composition according to claim 1 containing as active ingredients (1) 4,5,6,7-tetrachlorophthalide and (2) O-n-propyl-S,S-diphenylphosphorodithiolate.

4. The synergistic fungicidal composition according to claim 1 containing as active ingredients (1) 4,5,6,7-tetrachlorophthalide and (2) O-iso-propyl-S,S-diphenylphosphorodithiolate.

5. The synergistic composition according to claim 2 which contains from 0.1 to 95 percent by weight of the total of ingredients (I) and (II), and a pesticide carrier.

6. A method of combating fungus pests which comprises applying to the pests or a habitat thereof a fungicidally effective composition according to claim 1.

7. The method according to claim 6 in which a composition is used containing from 0.005 to 10 percent by weight of the total of ingredients (I) and (II), and a pesticide carrier.

8. The method according to claim 6 in which the composition is applied to an area of rice cultivation.

9. The method according to claim 6 in which the pests are rice blast or sheath blight causative organisms.

10. The method according to claim 6, in which the composition is applied in an amount of 15 to 1,000 g of the total of ingredients (I) and (II) per 10 ares.

* * * * *